US010661795B1

(12) United States Patent
Li et al.

(10) Patent No.: US 10,661,795 B1
(45) Date of Patent: May 26, 2020

(54) COLLISION DETECTION PLATFORM

(71) Applicant: Verizon Patent and Licensing Inc., Arlington, VA (US)

(72) Inventors: Ranxing Li, Cambridge, MA (US); Paul Brand, Coppell, TX (US); Philip C. Jacobs, Salem, NH (US); Fang-Pin Chang, San Marcos, CA (US); Abby Charfauros, San Diego, CA (US); Andrew W. Herson, Albany, CA (US); Sheng S. Du, San Diego, CA (US); Amanda UyenTrang Mai, San Diego, CA (US); George F. Clernon, Stoneham, MA (US); Bing Yao, San Diego, CA (US); Matthew B. Whited, Encinitas, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/227,549

(22) Filed: Dec. 20, 2018

(51) Int. Cl.

| | |
|---|---|
| ***G08G 1/00*** | (2006.01) |
| ***B60W 30/095*** | (2012.01) |
| ***G08G 1/16*** | (2006.01) |
| ***B60W 30/09*** | (2012.01) |
| ***G08G 1/04*** | (2006.01) |

(52) U.S. Cl.
CPC ........ *B60W 30/0956* (2013.01); *B60W 30/09* (2013.01); *G08G 1/04* (2013.01); *G08G 1/164* (2013.01); *G08G 1/166* (2013.01)

(58) Field of Classification Search
CPC .... B60W 30/0956; B60W 30/09; G08G 1/04; G08G 1/164; G08G 1/166
USPC .......................................................... 340/901
See application file for complete search history.

(56) References Cited

U.S. PATENT DOCUMENTS 6,757,328 B1 * 6/2004 Huang .................... G08G 1/04 375/240.1
10,203,699 B1 * 2/2019 Kim .................... G05D 1/0285
2008/0094250 A1 * 4/2008 Myr ........................ G08G 1/04 340/909
2010/0305857 A1 * 12/2010 Byrne ...................... G06T 7/73 701/301

(Continued)

OTHER PUBLICATIONS

Miovision Technologies Inc., “The Miovision smart city”, https://miovision.com/, Sep. 7, 2018, 4 pages.

(Continued)

*Primary Examiner* — Kerri L Mcnally
*Assistant Examiner* — Thang D Tran

(57) ABSTRACT

A device can receive data related to a roadway. The data can include video data of the roadway. The device can determine a pixel area of objects shown in the video data. The device can determine that a vehicle and an individual are associated with the roadway at a same time. The device can determine a protective zone around the individual based on a first pixel area of the individual. The protective zone can be associated with detecting a potential collision between the vehicle and the individual. The device can determine a first location and movement of the vehicle relative to a second location and movement of the individual. The device can predict that a second pixel area of the vehicle is to intersect the protective zone of the individual. The device can detect the potential collision. The device can perform one or more actions.

20 Claims, 7 Drawing Sheets

(56) References Cited

U.S. PATENT DOCUMENTS

2012/0119941 A1* 5/2012 Reiter .................... G01S 7/22 342/179
2013/0100281 A1* 4/2013 Sharma .............. G06K 9/00805 348/135
2013/0229518 A1* 9/2013 Reed .................... H04N 5/2354 348/148
2014/0071286 A1* 3/2014 Bernal .................... G06T 7/246 348/149
2014/0126778 A1* 5/2014 Yu ......................... G06T 3/4038 382/104
2014/0210646 A1* 7/2014 Subramanya ........... B61L 29/28 340/928
2015/0091714 A1* 4/2015 Ono ....................... G08G 1/165 340/435
2015/0210312 A1* 7/2015 Stein ..................... B60W 30/00 701/41
2016/0097849 A1* 4/2016 Nichols ................... G01S 13/91 342/107
2017/0098131 A1* 4/2017 Shashua ............. G06K 9/00805
2017/0131719 A1* 5/2017 Micks ................... B60W 40/08
2017/0178352 A1* 6/2017 Harmsen ................. G06T 7/579
2017/0372602 A1* 12/2017 Gilliland ............... G01S 17/023
2018/0096595 A1* 4/2018 Janzen ............... G06K 9/00785
2018/0113200 A1* 4/2018 Steinberg .............. G01S 7/4815
2018/0143307 A1* 5/2018 Steinberg ................ G01S 17/42
2018/0336424 A1* 11/2018 Jang ...................... B60W 40/04
2019/0035276 A1* 1/2019 Zruya ..................... H04W 4/44
2019/0057262 A1* 2/2019 Sai ........................... G08G 1/16
2019/0082377 A1* 3/2019 Silver ................... H04W 48/04
2019/0088148 A1* 3/2019 Jacobus ................... G08G 9/02
2019/0103026 A1* 4/2019 Liu ...................... G06K 9/3233
2019/0123915 A1* 4/2019 Simplicio, Jr. ..... H04L 63/0823
2020/0005644 A1* 1/2020 Ichimaru ................. B60R 21/00
2020/0027351 A1* 1/2020 Gotoda ................. B60W 50/14

OTHER PUBLICATIONS

Brisk Synergies, "Build Safer Roads for Smarter Cities", https://brisksynergies.com/ , Aug. 15, 2018, 4 pages.

Motionloft, "Real-Time Vehicle and Pedestrian Data. Made Simple.", https://motionloft.com/, Oct. 13, 2017, 6 pages.

Numina, "Real-time insights from streets", http://www.numina.com/, Jun. 28, 2017, 11 pages.

* cited by examiner

COLLISION DETECTION PLATFORM

BACKGROUND

Surveillance involves the observation or monitoring of behavior, activities, environments, and/or the like to detect dangerous situations, unlawful behavior, prohibited activity, and/or the like. Surveillance is often performed or aided by cameras, which can be used to observe an area. Such cameras are often connected to a network and/or recording device, and can provide images that can be watched by observers such as law enforcement or security officers.

DETAILED DESCRIPTION OF PREFERRED EMBODIMENTS

Figure 1A:
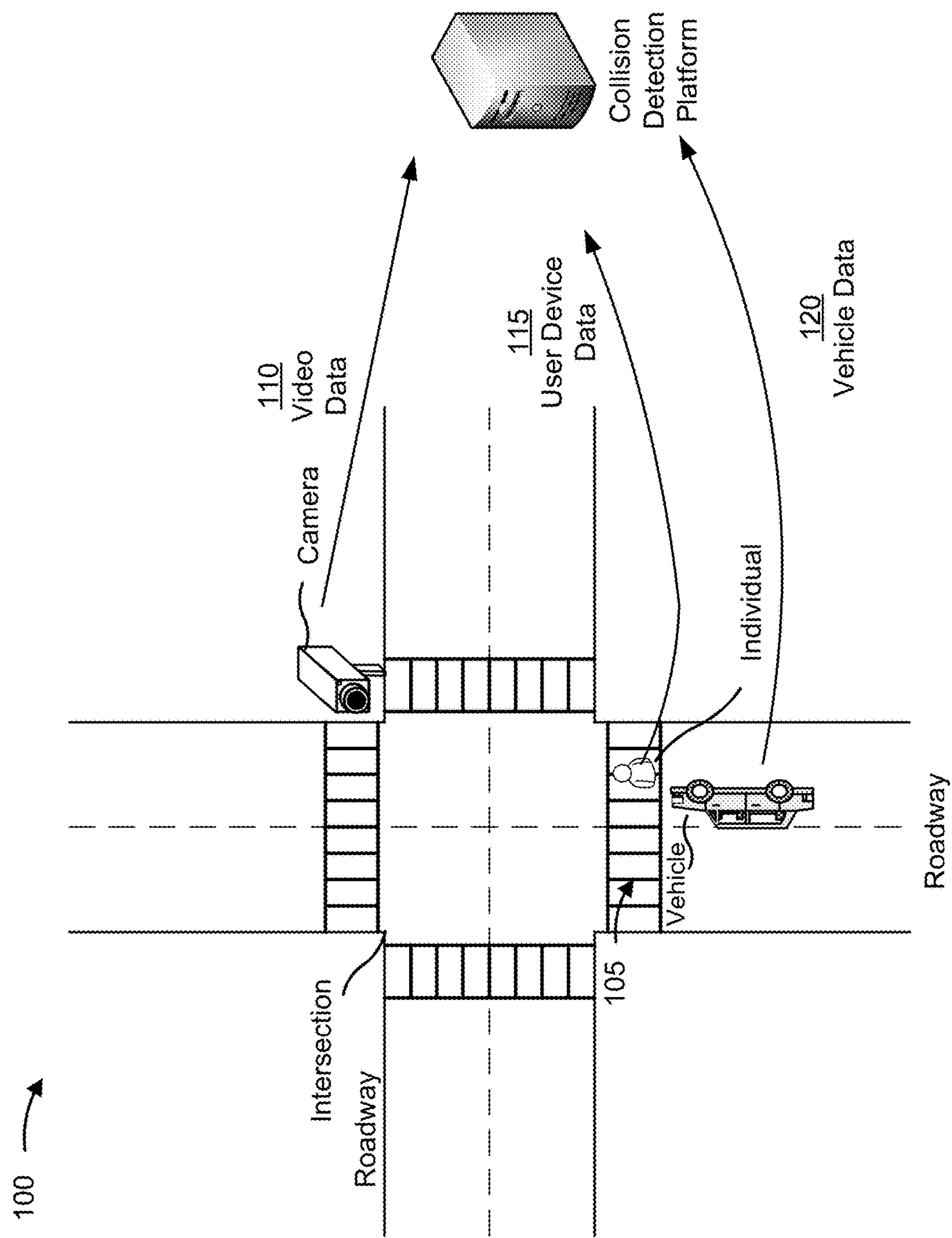
FIGS. 1A-3 are diagrams of example implementations described herein.

The following detailed description of example implementations refers to the accompanying drawings. The same reference numbers in different drawings can identify the same or similar elements.

As the quantity of vehicles on roadways increases, the probability of collisions between vehicles and individuals increases. The probability of these types of collisions is further increased with an increased presence of autonomous vehicles on the roadways. In some situations, an autonomous vehicle is not capable of detecting an individual in a roadway so as to avoid a collision between the autonomous vehicle and the individual. For example, when an individual is stepping into the roadway from behind an object, sensors, such as radar sensors, light detection and ranging (LIDAR) sensors, and/or the like of the autonomous vehicle, are not capable of detecting the individual prior to the individual stepping into a field of detection of the sensors. Sometimes, by the time the individual is within the field of detection of the sensors, the autonomous vehicle is not capable of avoiding a collision between the autonomous vehicle and the individual, due to a delay between detection of the individual by the sensors, processing by a system on-board the autonomous vehicle, and activation, by the on-board system, of one or more elements of the autonomous vehicle associated with performing an action to avoid a collision between the individual and the autonomous vehicle.

Some implementations described herein provide a collision detection platform that is capable of processing data from a set of cameras associated with a roadway, on-board systems associated with vehicles, user devices associated with individuals, equipment installed in infrastructure, such as a traffic light device, a crossing light device, and/or the like associated with a roadway, an open data platform, and/or the like to detect previous potential collisions between the vehicles and the individuals so as to determine whether the roadway is a dangerous roadway with respect to potential collisions between vehicles and individuals. In addition, the collision detection platform can perform one or more actions related to reducing a likelihood of collisions on the roadway after determining that the roadway is a dangerous roadway. In this way, the collision detection platform is capable of facilitating avoidance of potential collisions in situations when sensors and/or other components of the vehicle would be otherwise incapable of facilitating avoidance of the potential collisions, at locations that are identified as being dangerous roadways for pedestrians, cyclists, and/or the like. This improves a functioning of the vehicle by providing a tool that can be used to reduce or eliminate a likelihood of a collision between a vehicle and an individual when the vehicle would otherwise be incapable of detecting potential collisions. In addition, a result of an analysis performed by the collision detection platform can be used to update autonomous vehicle systems, navigation applications, and/or the like to flag an intersection with information that identifies the intersection as potentially dangerous, so that a vehicle can be routed around the intersection, so that operations of the vehicle can be modified when approaching the intersection, and/or the like. In addition, the collision detection platform can modify operations of the vehicle to provide the vehicle with additional time to perform actions to avoid a potential collision, such as by slowing a speed of the vehicle, a changing of a phase of a traffic light device and/or a crossing light device, activating a horn of the vehicle, and/or the like as the vehicle approaches a dangerous intersection, thereby reducing a likelihood that a collision will occur. Further, the collision detection platform provides a tool that can be used to analyze historical potential collisions associated with a roadway for purposes of re-designing the roadway to improve a safety of the roadway.

Further, some implementations described herein provide a way to process, by a camera, by an edge device, in a cloud computing environment, and/or the like, various types of data to detect a potential collision. In addition, some implementations described herein provide a collision detection platform that can be configured and/or re-configured in a variety of ways to perform various combinations of processing described herein. For example, the collision detection platform can be configured to perform different combinations of subsets of the processing described herein (e.g., at a same time or at different times), some processing can be off loaded from the collision detection platform to another device via configuration and/or re-configuration of the collision detection platform and/or the other device, and/or the like.

Figure 1B:
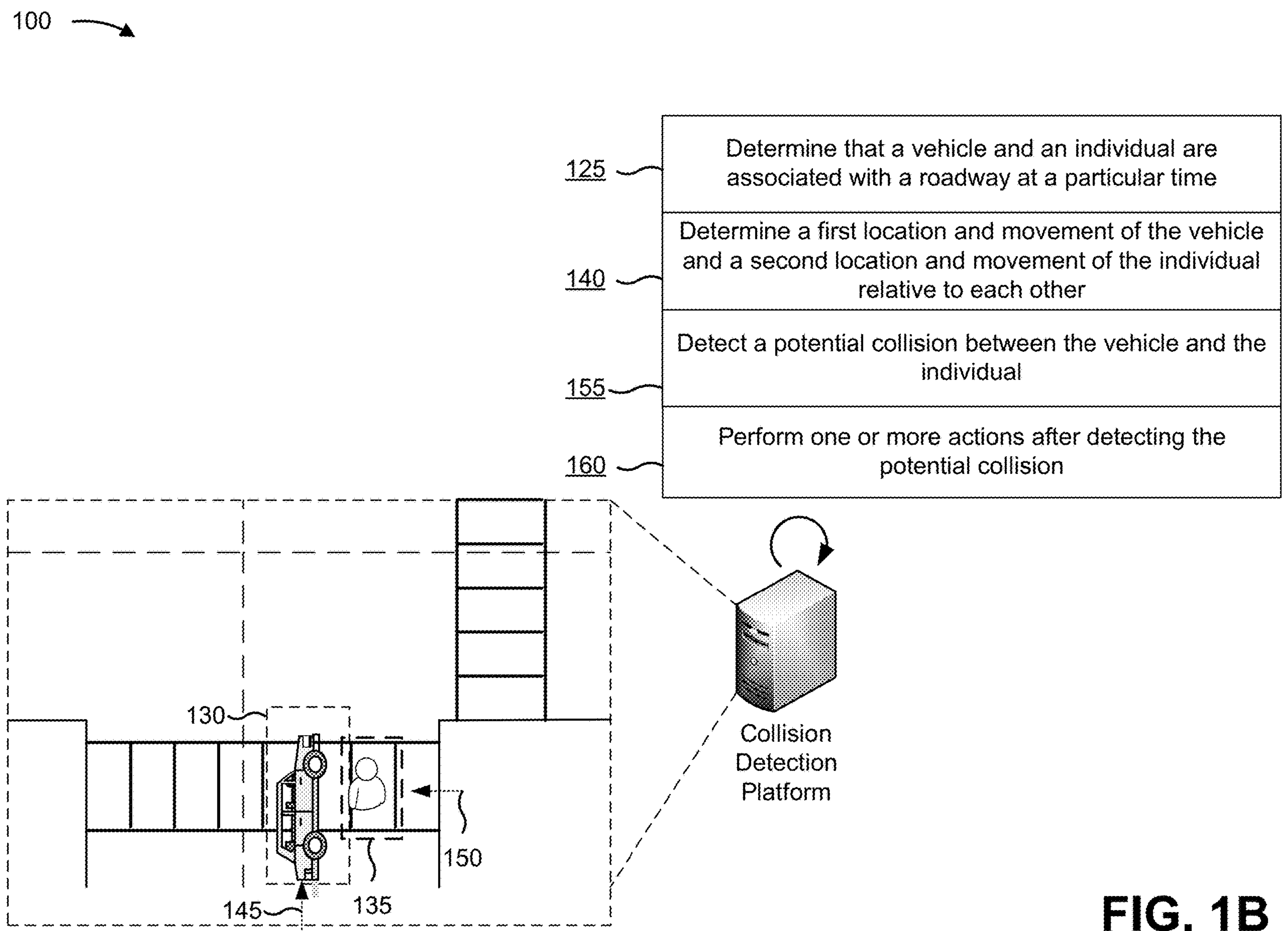

FIGS. 1A and 1B are diagrams of one or more example implementations 100 described herein. As shown in FIG. 1A, example implementation(s) 100 includes a vehicle (e.g., an autonomous vehicle, a non-autonomous vehicle with an on-board system, and/or the like) traveling on a roadway, a camera (e.g., deployed at an intersection of the roadway and another roadway), and a collision detection platform.

As shown by reference number 105, a camera can capture, over time, video data of the roadways, the intersection, and/or the like. For example, the camera can capture video data of the vehicle approaching and/or intersecting the cross-walk at a same time that an individual is traveling through a cross-walk across the roadway. As shown by reference number 110, the camera can provide, to the collision detection platform, video data captured of the intersection. For example, the camera can provide the video data in real-time or near real-time (e.g., as the video data is captured by the camera), according to a schedule, periodically, based on being requested by the collision detection platform to provide the video data, and/or the like. In some implementations, the video data can include (or be processed to identify) metadata related to the video data and/or the camera. For example, the video data (or processed video data generated by the camera or a device at an edge of a network) can include information that identifies a timestamp for the video data, an object classification of objects shown in the video data (e.g., a pedestrian, a car, a bike, and/or the like), a color of the objects, a speed of the objects, a location of the camera, an angle of the camera relative to the roadways, a distance the camera is located from a particular point associated with the intersection or one of the roadways, and/or the like. In some implementations, multiple cameras can provide millions, billions, or more frames of video data to the collision detection platform at a time or within a time window, thereby providing a data set that is difficult, if not impossible, to process using standard computing devices.

In some implementations, the collision detection platform can process the video data. Additionally, or alternatively, the camera, or a device located at an edge of a network and between the camera and the collision detection platform, can process the video data (e.g., to provide metadata related to the video data, metadata related to a camera that captured the video data, and/or the like).

As shown by reference number 115, a user device (not shown) associated with the individual can provide user device data to the collision detection platform. For example, the user device can provide the user device data to the collision detection platform in real-time or near real-time, based on a sensor associated with the user device detecting a signal output by a crossing signal device associated with the cross-walk (e.g., where the signal output by the crossing signal device triggers the user device to provide the user device data based on the user device being near the cross-walk), and/or the like. In some implementations, the user device data can include location data that identifies a location of the user device, motion data that identifies a direction and/or speed of travel of the user device, timestamps for the user device data, and/or the like. In some implementations, multiple user devices can provide millions, billions, or more data elements to the collision detection platform at a time or within a time window, thereby providing a data set that is difficult, if not impossible, to process using standard computing devices.

As shown by reference number 120, the vehicle (e.g., an on-board system associated with the vehicle) can provide vehicle data to the collision detection platform. For example, the vehicle can provide the vehicle data to the collision detection platform in real-time or near real-time, based on a sensor associated with the vehicle detecting a signal output by a crossing signal device in a manner similar to that described above, and/or the like. In some implementations, the vehicle data can include data elements similar to the user device data described above. Additionally, or alternatively, the vehicle data can include data from a sensor associated with the vehicle, such as a proximity sensor, an infrared sensor, a LIDAR sensor, and/or the like (e.g., that indicates a proximity of the vehicle to one or more objects). In some implementations, multiple vehicles can provide millions, billions, or more data elements to the collision detection platform at a time, thereby providing a data set that is difficult, if not impossible, to process using standard computing devices.

Turning to FIG. 1B, and as shown by reference number 125, the collision detection platform can determine, from the video data, that a vehicle and an individual are associated with a roadway at a particular time. For example, the collision detection platform can determine, as shown in the video data, that the vehicle is on a particular roadway and is approaching a cross-walk across the particular roadway, which the individual is using to cross the particular roadway. In some implementations, the collision detection platform can determine that the vehicle and the individual are associated with the roadway in real-time or near real-time, after video data for a threshold amount of time is received from the camera, based on receiving input from a user of the collision detection platform, and/or the like.

In some implementations, the collision detection platform can determine that the vehicle and the individual are associated with the roadway at the particular time based on a pixel area of objects shown in the video data. For example, the collision detection platform can process the video data to determine a pixel area of objects shown in the video data (e.g., a two-dimensional area of pixels used for an object shown in the video data).

In some implementations, the collision detection platform can use an image processing technique to determine the pixel area of an object, to detect an object in the video data, and/or the like. For example, the collision detection platform can use a computer vision technique, a feature detection technique, a three-dimensional (3D) object detection technique, and/or the like to detect an object in the video data, a pixel area of the object, and/or the like. In some implementations, the collision detection platform can use a machine learning model to determine the pixel area of objects shown in the video data, to identify objects shown in the video data, and/or the like. For example, the machine learning model can have been trained on a training set of data that includes video data and information that identifies objects shown in the video data, a location of the objects within frames of the video data, and/or the like. In this way, the collision detection platform can use one or more various processing techniques to map objects shown in an image to a real-world topology for detection of a collision or a potential collision.

In some implementations, the collision detection platform can determine that particular objects are shown in the video data based on pixel areas for the particular objects. For example, the collision detection platform can determine a pixel area for an object shown in the video data, and can determine that the pixel area matches a predicted pixel area for a particular type of object. Continuing with the previous example, the collision detection platform can determine that the video data shows the vehicle and the individual based on a first pixel area for a first object shown in the video data matching a predicted pixel area for an individual and a second pixel area for a second object shown in the video data matching a predicted pixel area for a vehicle.

In some implementations, the collision detection platform can determine that the vehicle and the individual are associated with the roadway at a particular time based on identifying the vehicle and the individual in a same frame of the video data, in different frames from different cameras associated with a particular time (e.g., based on timestamps associated with the different frames), and/or the like.

In some implementations, the collision detection platform can adjust identification of objects in the video data based on metadata associated with the video data. For example, the collision detection platform can determine predicted pixel areas for various types of objects based on an angle of a field of view of the camera, a distance of the camera from a location in the field of view of the camera, and/or the like. Continuing with the previous example, the collision detection platform can determine the predicted pixel areas using a data structure that identifies different predicted pixel areas for different objects based on different metadata, by processing the metadata using a machine learning model, and/or the like.

In some implementations, the collision detection platform can determine that a vehicle and an individual are associated with a roadway (or a portion of a roadway) at a particular time using vehicle data, user device data, and/or the like. For example, the collision detection platform can use global position system (GPS) data included in the vehicle data, the user device data, and/or the like to determine that the vehicle and the individual are within a threshold distance of each other when the vehicle is traveling on a roadway (e.g., as determined from the GPS data, from interaction of sensors of the vehicle and sensors of the user device interacting with a sensor associated with the crossing signal device, and/or the like).

Reference number 130 shows an example of the collision detection platform determining that the video data shows a vehicle associated with a roadway (e.g., based on a pixel area of the vehicle as shown in the video data). Reference number 135 shows an example of the collision detection platform determining that the video data shows an individual associated with the roadway (e.g., based on a pixel area of the individual as shown in the video data). In some implementations, the collision detection platform can determine that the video data shows the vehicle and the individual as being associated with the roadway at a same time.

As shown by reference number 140, the collision detection platform can determine a first location and movement of the vehicle and a second location and movement of the individual relative to each other. For example, the collision detection platform can determine a location of the vehicle on the roadway and/or the cross-walk, a location of the vehicle relative to the individual, a direction of travel of the vehicle, a speed of travel of the vehicle, a location of the individual relative to the roadway and/or the cross-walk, a direction of travel of the individual, a speed of travel of the individual, and/or the like. In some implementations, the collision detection platform can determine the first location and movement and the second location and movement after determining that the vehicle and the individual are associated with a roadway at a particular time. This conserves processing resources that would otherwise be wasted determining a location and/or movement of vehicles and/or individuals when there is no likelihood of a collision.

In some implementations, the collision detection platform can determine the first location and movement and the second location and movement from the video data. For example, the collision detection platform can identify the vehicle and/or the individual in a first frame of the video data (e.g., based on a pixel area of objects shown in the first frame, based on using an image processing technique, and/or the like), and can track the vehicle and the individual across one or more other subsequent frames of the video data to determine the first location and movement of the vehicle and the second location and movement of the individual. Additionally, or alternatively, the collision detection platform can determine the first location and movement and the second location and movement from vehicle data, user device data, and/or the like. For example, the collision detection platform can determine the first location and movement of the vehicle from GPS data for the vehicle and can determine the second location and movement of the individual from GPS data for the user device.

Reference number 145 shows an example of the collision detection platform determining the first location and movement of the vehicle. For example, the collision detection platform can determine, across multiple frames of the video data and/or from vehicle data, that the vehicle is traveling in a direction of a cross-walk (or through the cross-walk) associated with the roadway at a particular speed. In some implementations, the collision detection platform can determine that the vehicle is stopped. In this case, the collision detection platform can determine to not perform further processing related to detecting a potential collision. This conserves processing resources of the collision detection platform by reducing or eliminating a need for the collision detection platform to perform detection of a potential collision when a potential collision would have been unlikely based on the vehicle being stopped.

Reference number 150 shows an example of the collision detection platform determining the second location and movement of the individual. For example, the collision detection platform can determine, across multiple frames of the video data and/or from user device data, that the individual is traveling across a cross-walk associated with the roadway at a particular time, a speed at which the individual is travelling across the cross-walk, and/or the like. In some implementations, the collision detection platform can determine to not perform further processing related to detecting a potential collision when the collision detection platform determines that the individual is located on a side walk and/or is stopped on the sidewalk, when the individual is located on a median between lanes of a roadway, and/or the like. This conserves processing resources of the collision detection platform by reducing or eliminating a need for the collision detection platform to perform detection of a potential collision when a collision would have been unlikely based on the location and/or speed of the individual.

In some implementations, the collision detection platform can determine a protective zone around the individual in the video to detect a potential collision between the vehicle and the individual. For example, the collision detection platform can determine an area of pixels around an area of pixels of the individual in the video data as the protective zone. In some implementations, and as described below, the protective zone can be associated with detecting a potential collision between the vehicle and the individual. In some implementations, the collision detection platform can determine a similar zone around the vehicle to detect a potential collision between the individual and the vehicle. In some implementations, the protective zone can be based on a direction of travel and/or a speed of travel of the individual and/or the vehicle. For example, the collision detection platform can determine a protective zone that has a larger quantity of pixels on sides of the vehicle and/or the individual that would be likely to collide based on location and/or direction of travel of the vehicle and/or the individual. In some implementations, the collision detection platform can determine the protective zone based on vehicle data and/or user device data. For example, the collision detection platform can determine an area around GPS tracks included in the vehicle data and/or the user device data as the protective zone.

As shown by reference number 155, the collision detection platform can detect a potential collision between the vehicle and the individual. For example, the collision detection platform can detect the potential collision after determining the first location and movement of the vehicle, after determining the second location and movement of the individual, after determining a protective zone around the individual and/or the vehicle in the video data, and/or the like.

In some implementations, the collision detection platform can detect the potential collision based on detecting that the vehicle intersected the protective zone of the individual, that the vehicle is predicted to intersect the protective zone of the individual based on the first location and movement of the vehicle relative to the second location and movement of the individual, and/or the like. For example, the collision detection platform can detect the potential collision based on detecting, from the video data, that a pixel area of the vehicle intersects the protective zone of the individual, that the pixel area of the vehicle is predicted to intersect the protective zone of the individual, that a zone around the vehicle intersected or is predicted to intersect the protective zone around the individual, and/or the like. Continuing with the previous example, the collision detection platform can determine a distance between an area of pixels of the vehicle and the protective zone around the individual (e.g., a quantity of pixels between the area of pixels of the vehicle and the protective zone around the individual), and can detect the potential collision when the distance satisfies a threshold.

In some implementations, the collision detection platform can perform a similar analysis using the vehicle data, the user device data, and/or the like to detect a potential collision. For example, the collision detection platform can detect a potential collision between the vehicle and the individual when a GPS distance between the vehicle and the individual satisfies a threshold.

In some implementations, the collision detection platform can use a combination of video data, vehicle data, user device data, and/or the like to perform one or more analyses described herein. For example, the collision detection platform can perform an initial analysis using GPS data from the vehicle and the user device to quickly determine whether the vehicle and the individual are associated with a roadway and/or to determine locations and movements of the vehicle and the individual, and can perform another analysis of the video data to detect a potential collision between the vehicle and the individual when the initial analysis indicates that the vehicle and the individual can collide based on the locations and movements of the vehicle and the individual. This facilitates use of various types of data to optimize use of processing resources of the collision detection platform, to optimize an accuracy of performing one or more analyses described herein, and/or the like. For example, using GPS data in the manner described above can provide faster results for some analyses relative to other analyses, and using video data can provide more accurate results for some analyses relative to other analyses.

As shown by reference number 160, the collision detection platform can perform one or more actions after detecting the potential collision. For example, the collision detection platform can perform the one or more actions automatically after detecting the potential collision, based on receiving input from a user of the collision detection platform to perform the one or more actions, and/or the like.

In some implementations, the collision detection platform can perform an analysis to determine a cause of the potential collision. For example, the collision detection platform can receive phase data that indicates a phase of a traffic controller device associated with the first roadway and/or the second roadway (e.g., a stop phase, a slow phase, or a go phase), a phase of the crossing light device associated with the cross-walk (e.g., a cross phase, a stop phase, a countdown to a phase change, and/or the like), and/or the like. Continuing with the previous example, the collision detection platform can determine the vehicle as a cause of the potential collision by determining that the vehicle is violating a phase of the traffic controller device, can determine that the individual is the cause of the potential collision by determining that the individual is violating a phase of the crossing light device, and/or the like.

Additionally, or alternatively, the collision detection platform can receive traffic rule data that identifies a set of traffic rules and can determine whether the vehicle or the individual is a cause of the potential collision based on the set of traffic rules (e.g., by determining, from the video data or other data, that the vehicle changed lanes in an intersection thereby causing the potential collision, that the vehicle is speeding thereby causing the potential collision, that the individual is crossing the road without using a cross-walk thereby causing the potential collision, that the individual stepped into the roadway from behind another object thereby causing the potential collision, and/or the like).

In some implementations, the collision detection platform can analyze a phase of a traffic light device and/or a crossing light device across multiple potential collisions. For example, the collision detection platform can determine that a threshold quantity or percentage of potential collisions occur in the first five second of a northbound stop phase lasting 30 seconds, that a threshold quantity or percentage of potential collisions are associated with a right turn lane during a go phase of a traffic light device, and/or the like. Additionally, or alternatively, the collision detection platform can perform an analysis of a behavior of a vehicle at a time of a potential collision. For example, the collision detection platform can determine, based on processing video data and/or vehicle data, that a vehicle did not come to a complete stop during a stop phase of a traffic light device before turning right during the stop phase, can determine that the vehicle was travelling through an intersection at or below a speed limit during a go phase of a traffic light device associated with the intersection, and/or the like.

In some implementations, the collision detection platform can issue a ticket to the vehicle, an owner of the vehicle, and/or the individual based on determining a cause of the potential collision. For example, the collision detection platform can store an electronic record of the ticket in a server device, can send a message to the vehicle or a user device associated with the owner of the vehicle and/or the user device associated with the individual indicating that the ticket has been issued, and/or the like.

In some implementations, the collision detection platform can perform an analysis of the potential collision and/or one or more other collisions associated with a roadway. For example, the collision detection platform can perform an analysis of historical data (e.g., historical video data, historical vehicle data, historical user device data, and/or the like) to identify a quantity, a pattern, a trend, and/or the like of potential collisions associated with a roadway, such as related to a time of day of the potential collisions, a cause of the potential collisions, and/or the like. In some implementations, the collision detection platform can identify the roadway, or a portion of the roadway, as a dangerous roadway. For example, the collision detection platform can determine that a roadway is a dangerous roadway based on a quantity of potential collisions, a pattern of potential collisions, and/or the like associated with the roadway.

In some implementations, the collision detection platform can generate a model for a roadway related to patterns, quantities, and/or the like of potential collisions on the roadway based on time of day or day of the week, weather conditions, events (e.g., a concert, a sporting event, a broken down vehicle, and/or the like), and/or the like as determined from timestamps associated with detected potential collisions, weather data, event data, and/or the like. In some implementations, the collision detection platform can use the model to identify times at which to perform various actions described below, a priority of the roadway for re-design, and/or the like.

In some implementations, the collision detection platform can perform one or more actions for vehicles and/or individuals approaching the roadway (e.g., as determined from vehicle data and/or user device data). For example, after identifying the roadway as a dangerous roadway, the collision detection platform can send a set of instructions to a vehicle approaching the roadway to reduce a speed of the vehicle, to turn on headlights of the vehicle, to activate a horn of the vehicle, to activate an output component in a cabin of the vehicle to alert a user of the vehicle of the dangerous roadway, to reroute the vehicle onto another roadway, to cause the vehicle to change lanes (e.g., away from a sidewalk along the roadway), and/or the like. Additionally, or alternatively, and as another example, the collision detection platform can send a message to a user device for display that indicates that the roadway is a dangerous roadway, can send a message that includes information regarding alternative ways to cross the roadway that are safer than a cross-walk at which the individual is located, can activate an output component associated with the user device to indicate that the roadway is a dangerous roadway, and/or the like.

In some implementations, the collision detection platform can use a result of analyzing potential collisions associated with a roadway to generate a recommendation for re-design of the roadway (e.g., re-design of cross-walks, phase cycles of traffic controller devices and/or crossing light devices, and/or the like). For example, the collision detection platform can use a machine learning model, similar to that described elsewhere herein, to generate the recommendation. In some implementations, the collision detection platform can update the machine learning model based on a result of the recommendation (e.g., whether a user of the collision detection platform inputs information that indicates that a recommendation is to be implemented, whether a quantity and/or pattern of potential collisions associated with the roadway changes after a re-design of the roadway, and/or the like). In some implementations, the collision detection platform can output a result of an analysis of historical data, a generated recommendation, and/or the like for display. Additionally, or alternatively, the collision detection platform can perform an action related to implementing a re-design. For example, the collision detection platform can send a set of instructions to a traffic controller device and/or a crossing light device to modify operations of the traffic controller device and/or the crossing light device, can generate a work order that includes information identifying one or more generated recommendations and can output the work order for display, can schedule an individual to be dispatched to the roadway to implement a recommended re-design, can send a message to a user device associated with the individual to cause the individual to be dispatched to the roadway, and/or the like.

Additionally, or alternatively, the collision detection platform can send a message to the camera to modify operations of the camera based on determining that the roadway is a dangerous roadway. For example, the collision detection platform can send a message to the camera to cause the camera to start capturing video data at a particular quality (e.g., at a particular resolution), to cause the camera to turn on a light associated with the camera and/or to activate a flash associated with the camera to improve a quality of the video data captured by the camera, to capture images at a particular rate per time period, and/or the like. In some implementations, the collision detection platform can store the video data and/or other data described herein in a server device based on determining that the roadway is a dangerous roadway, can provide this data for display via a user device, and/or the like.

In this way, the collision detection platform provides a tool that can be used to quickly and accurately analyze potential collisions associated with a roadway. In addition, the collision detection platform can identify a roadway as a dangerous roadway based on analyzing the potential collisions and can perform one or more actions to reduce or eliminate future potential collisions. This improves a safety of the roadway, particularly in situations when a vehicle and/or a user of the vehicle would not be capable of detecting a potential collision in time to take evasive actions to avoid the potential collision. In addition, the collision detection platform provides a tool that can optimize use of various types of data and/or processing techniques to analyze a roadway, thereby optimizing use of processing resources of the collision detection platform. Further, the collision detection platform provides a tool to analyze historical potential collisions in a manner that was not previously possible due the amount of data associated with the historical potential collisions.

As indicated above, FIGS. 1A and 1B are provided merely as an example. Other examples can differ from what was described with regard to FIGS. 1A and 1B. Although FIGS. 1A and 1B were described in a context of potential collisions between a vehicle and an individual, the implementations apply equally to potential collisions between vehicles, between vehicles and bicycles, between bicycles and individuals, and/or the like. In addition, the implementations apply equally to other types of vehicles than what is shown in FIGS. 1A and 1B, such as planes, trains, boats, motorcycles, bicycles, and/or the like.

Although FIGS. 1A and 1B describe a collision detection platform as processing various types of data, in some implementations, an edge device (e.g., a server device) deployed at an edge of a network (e.g., as part of the collision detection platform or separate from the collision detection platform) can perform processing, described herein, of one or more of the various types of data. Additionally, or alternatively, a camera can perform processing, described herein, of one or more of the various types of data. In these cases, the edge device and the camera, when used to process data, can provide a result of the processing to the collision detection platform for further processing, for analysis, and/or the like, can provide a result to a vehicle (e.g., to modify operations of the vehicle), and/or the like. In some implementations, processing by an edge device (rather than a camera or a collision detection platform) can reduce power (e.g., battery) needs of the camera and/or can conserve bandwidth between the edge device and the collision detection platform. In some implementations, a 5G network (or another network protocol) can be utilized to connect an edge device with a camera, a collision detection platform, and/or other objects such as vehicles (e.g., to modify operations of the vehicle) to reduce a latency of data communications, to conserve bandwidth, and/or the like. In some implementations, processing by a camera (e.g., rather than an edge device or a collision detection platform) can conserve bandwidth between the camera and a collision detection platform or between the camera and an edge device, can reduce latency associated with providing data to the collision detection platform and/or the edge device for processing, can facilitate faster processing (and real-time or near real-time performance of actions), and/or the like.

Figure 2:
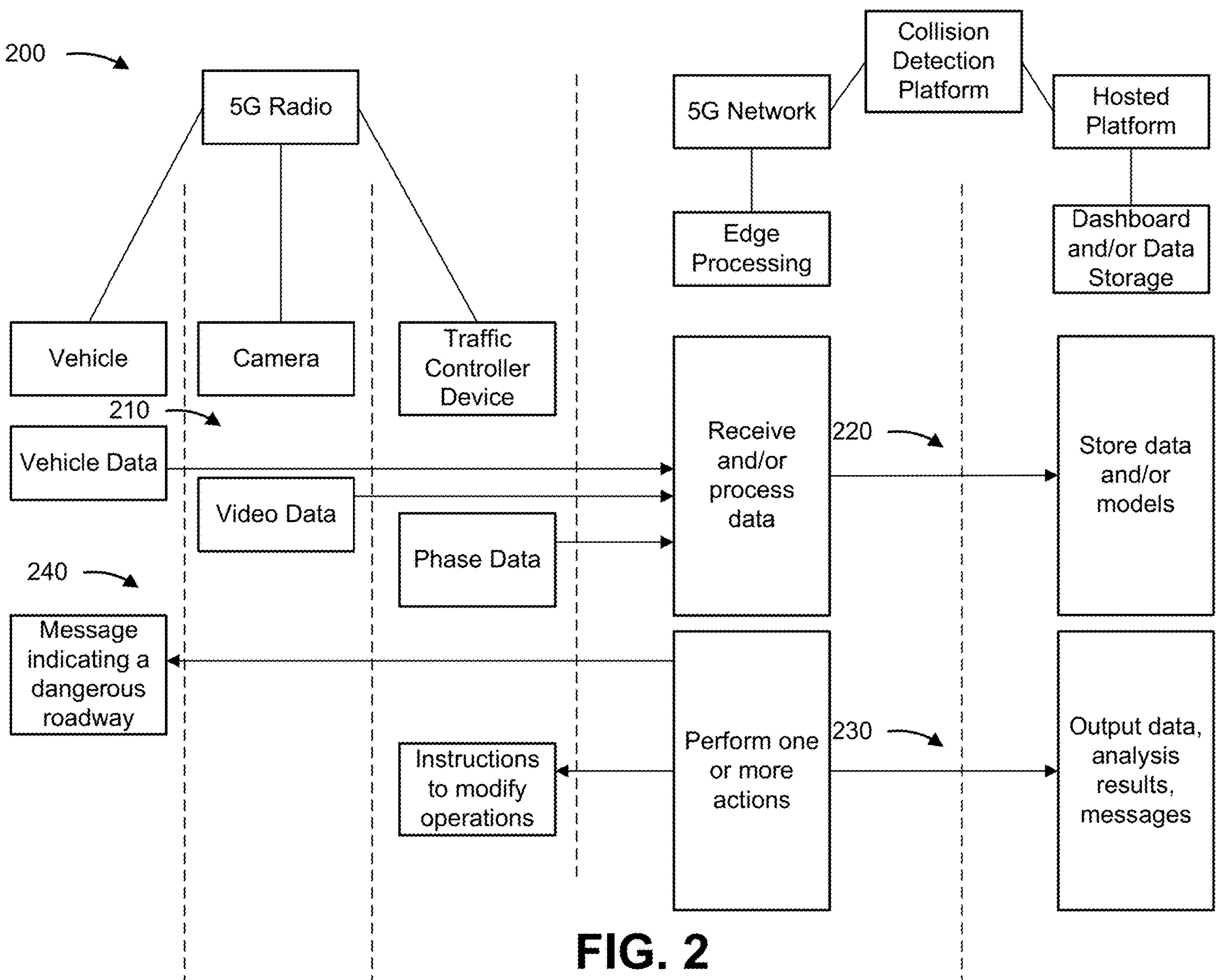

FIG. 2 is a diagram of an example implementation 200 described herein. As shown in FIG. 2, implementation 200 includes a 5G radio (e.g., a 5G base station), and a collision detection platform partially deployed on a 5G network and partially deployed as a hosted platform (e.g., on a user device, on a server device, and/or the like).

As shown by reference number 210, various devices, such as a vehicle, a camera, a traffic controller device, and/or the like, can provide data to the collision detection platform in a manner similar to that described elsewhere herein. For example, the various devices can provide the data via a 5G radio. In some implementations, the collision detection platform can receive the data via a 5G network and/or can perform various processing of the data on the 5G network, in a manner similar to that described elsewhere herein. In some implementations, processing described herein can be performed at an edge of a 5G network (e.g., shown as "Edge Processing" in FIG. 2). For example, a server device located at an edge of a network (e.g., deployed between a camera and the collision detection platform, deployed as an edge component of the collision detection platform or separate from the collision detection platform, and/or the like) can process video data, user device data, vehicle data, and/or the like in a manner that is the same as or similar to that described herein. Additionally, or alternatively, processing described herein can be performed by a camera, or another device, located at a roadway, which can provide a result of the processing to the collision detection platform, to an edge device, and/or the like for further processing, for analysis, and/or the like.

As shown by reference number 220, the collision detection platform can store data and/or models described herein in a server device associated with a portion of the collision detection platform that is hosted. In some implementations, the collision detection platform can perform one or more actions similar to that described elsewhere herein. For example, and as shown by reference number 230, the collision detection platform can output data, analysis results, messages, and/or the like via a dashboard or other user interface. Additionally, or alternatively, and as additional examples shown by reference number 240, the collision detection platform can send a message to the vehicle indicating a dangerous roadway, can send instructions to the traffic controller device to modify operations of the traffic controller device, and/or the like.

As indicated above, FIG. 2 is provided merely as an example. Other examples can differ from what was described with regard to FIG. 2.

Figure 3:
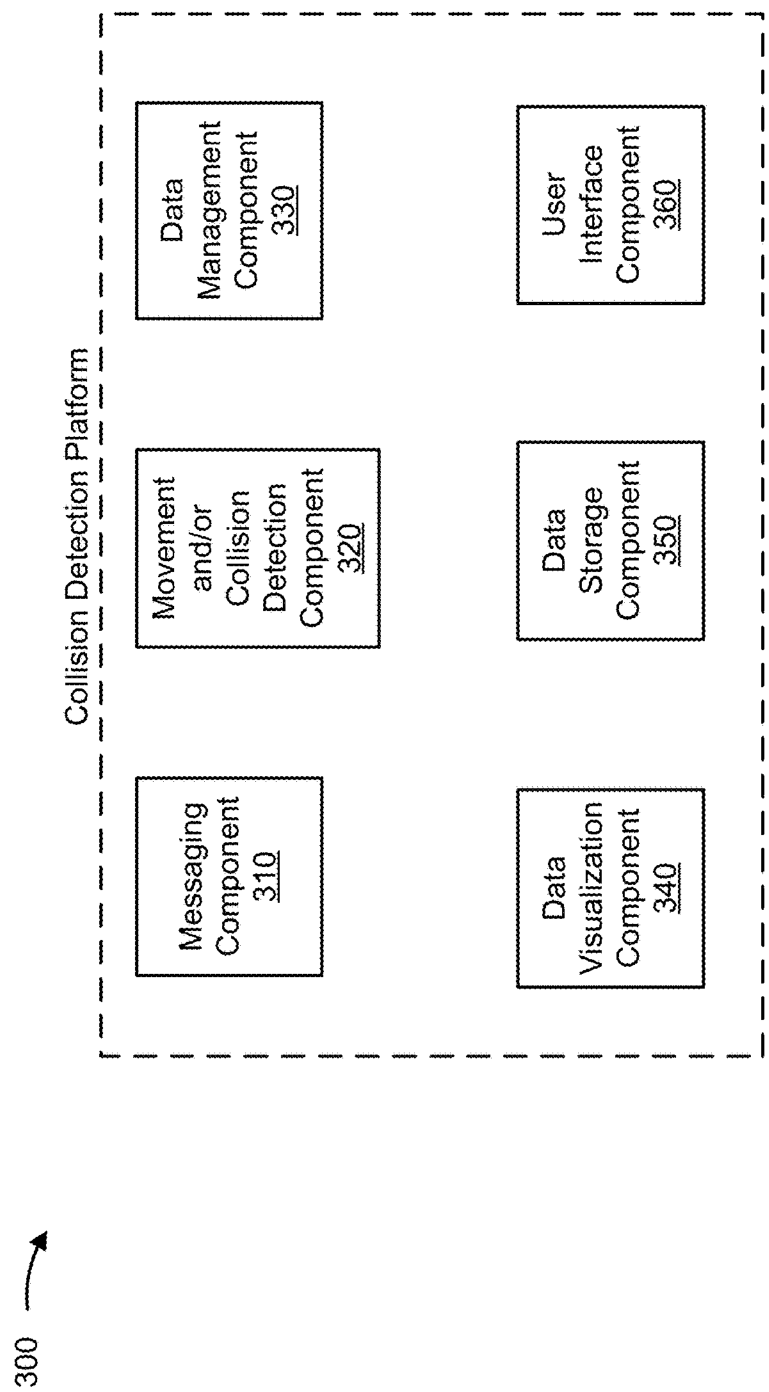

FIG. 3 is a diagram of an example implementation 300 described herein. FIG. 3 shows example components of a collision detection platform.

As shown in FIG. 3, the collision detection platform can include a messaging component 310. For example, the collision detection platform can use messaging component 310 to send a message, a set of instructions, and/or the like in a manner similar to that described elsewhere herein. As further shown in FIG. 3, the collision detection platform can include a movement and/or collision detection component 320. For example, the collision detection platform can use movement and/or collision detection component 320 to determine a location and/or movement of a vehicle and/or an individual, to detect a potential collision between the vehicle and the individual, and/or the like in a manner similar to that described elsewhere herein.

As further shown in FIG. 3, the collision detection platform can include a data management component 330. For example, the collision detection platform can use data management component 330 to receive, store, process, modify, access, and/or the like data described herein. As further shown in FIG. 3, the collision detection platform can include a data visualization component 340. For example, the collision detection platform can use data visualization component 340 to provide data for display, to populate a user interface with data, to generate charts, graphs, and/or the like from data, and/or the like.

As further shown in FIG. 3, the collision detection platform can include a data storage component 350. For example, data storage component 350 can include a data structure used to store data, results of analyses, and/or the like. As further shown in FIG. 3, the collision detection platform can include a user interface component 360. For example, the collision detection platform can use the user interface component 360 to provide a set of user interfaces for display to a user of the collision detection platform. Continuing with the previous example, the collision detection platform can generate a 3D model of a potential collision (e.g., using a 3D object detection technique to process video data), and can provide the 3D model for display.

As indicated above, FIG. 3 is provided merely as an example. Other examples can differ from what was described with regard to FIG. 3. The number and arrangement of components shown in FIG. 3 are provided as an example. In practice, the collision detection platform can include additional components, fewer components, different components, or differently arranged components than those shown in FIG. 3. Additionally, or alternatively, a set of components (e.g., one or more components) of the collision detection platform can perform one or more functions described as being performed by another set of components of the collision detection platform.

Figure 4:
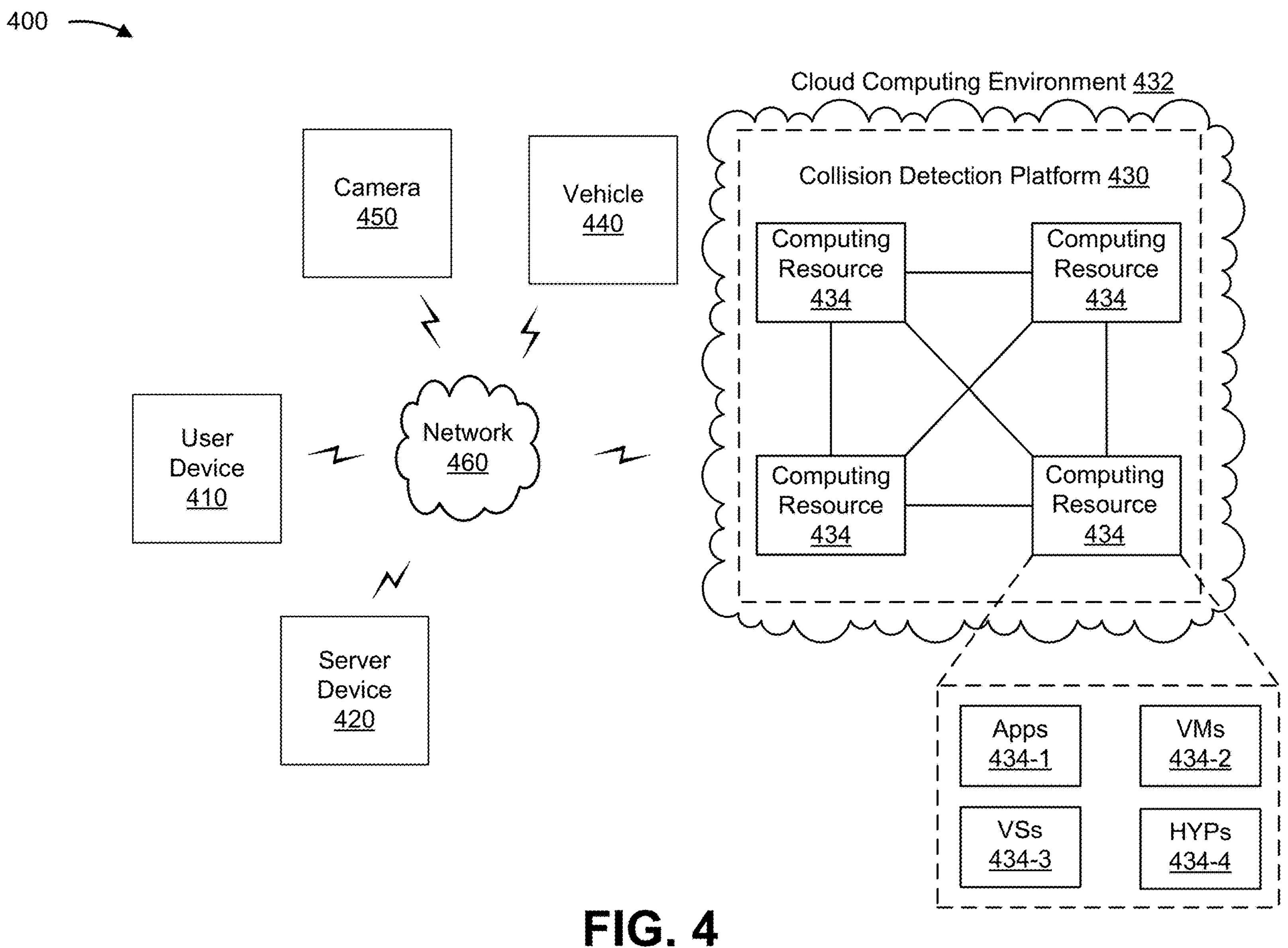
FIG. 4 is a diagram of an example environment in which systems and/or methods described herein can be implemented.

FIG. 4 is a diagram of an example environment 400 in which systems and/or methods described herein can be implemented. As shown in FIG. 4, environment 400 can include a user device 410, a server device 420, a collision detection platform 430 hosted within a cloud computing environment 432 that includes a set of computing resources 434, a vehicle 440, a camera 450, and a network 460. Devices of environment 400 can interconnect via wired connections, wireless connections, or a combination of wired and wireless connections.

User device 410 includes one or more devices capable of receiving, generating, storing, processing, and/or providing information associated with detecting a potential collision. For example, user device 410 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, user device 410 can provide, to collision detection platform, user device data, as described elsewhere herein. Additionally, or alternatively, user device 410 can receive, from collision detection platform 430, a message related to a potential collision, as described elsewhere herein.

Server device 420 includes one or more devices capable of receiving, generating storing, processing, and/or providing information associated with detecting a potential collision. For example, server device 420 can include a server (e.g., in a data center or a cloud computing environment), a data center (e.g., a multi-server micro datacenter), a workstation computer, a virtual machine (VM) provided in a cloud computing environment, or a similar type of device. In some implementations, server device 420 can include a communication interface that allows server device 420 to receive information from and/or transmit information to other devices in environment 400. In some implementations, server device 420 can be a physical device implemented within a housing, such as a chassis. In some implementations, server device 420 can be a virtual device implemented by one or more computer devices of a cloud computing environment or a data center. In some implementations, server device 420 can store information related to detecting a potential collision, as described elsewhere herein. Additionally, or alternatively, server device 420 can perform processing, described herein, of data. For example, server device 420 can be an edge device located at an edge of network 460 between one or more devices associated with a roadway (e.g., user device 410, vehicle 440, and/or camera 450) and collision detection platform 430, and can process data in a manner that is the same as or similar to that described elsewhere herein.

Collision detection platform 430 includes one or more devices capable of receiving, generating, storing, processing, and/or providing information related to detecting a collision. For example, collision detection platform 430 can include a cloud server or a group of cloud servers. In some implementations, collision detection platform 430 can be designed to be modular such that certain software components can be swapped in or out depending on a particular need. As such, collision detection platform 430 can be easily and/or quickly reconfigured for different uses.

In some implementations, as shown in FIG. 4, collision detection platform 430 can be hosted in cloud computing environment 432. Notably, while implementations described herein describe collision detection platform 430 as being hosted in cloud computing environment 432, in some implementations, collision detection platform 430 can be non-cloud-based (i.e., can be implemented outside of a cloud computing environment) or can be partially cloud-based.

Cloud computing environment 432 includes an environment that hosts collision detection platform 430. Cloud computing environment 432 can provide computation, software, data access, storage, and/or other services that do not require end-user knowledge of a physical location and configuration of a system and/or a device that hosts collision detection platform 430. As shown, cloud computing environment 432 can include a group of computing resources 434 (referred to collectively as "computing resources 434" and individually as "computing resource 434").

Computing resource 434 includes one or more personal computers, workstation computers, server devices, or another type of computation and/or communication device. In some implementations, computing resource 434 can host collision detection platform 430. The cloud resources can include compute instances executing in computing resource 434, storage devices provided in computing resource 434, data transfer devices provided by computing resource 434, etc. In some implementations, computing resource 434 can communicate with other computing resources 434 via wired connections, wireless connections, or a combination of wired and wireless connections.

As further shown in FIG. 4, computing resource 434 can include a group of cloud resources, such as one or more applications ("APPs") 434-1, one or more virtual machines ("VMs") 434-2, one or more virtualized storages ("VSs") 434-3, or one or more hypervisors ("HYPs") 434-4.

Application 434-1 includes one or more software applications that can be provided to or accessed by one or more devices of environment 400. Application 434-1 can eliminate a need to install and execute the software applications on devices of environment 400. For example, application 434-1 can include software associated with collision detection platform 430 and/or any other software capable of being provided via cloud computing environment 432. In some implementations, one application 434-1 can send/receive information to/from one or more other applications 434-1, via virtual machine 434-2. In some implementations, application 434-1 can include a software application associated with one or more databases and/or operating systems. For example, application 434-1 can include an enterprise application, a functional application, an analytics application, and/or the like.

Virtual machine 434-2 includes a software implementation of a machine (e.g., a computer) that executes programs like a physical machine. Virtual machine 434-2 can be either a system virtual machine or a process virtual machine, depending upon use and degree of correspondence to any real machine by virtual machine 434-2. A system virtual machine can provide a complete system platform that supports execution of a complete operating system ("OS"). A process virtual machine can execute a single program, and can support a single process. In some implementations, virtual machine 434-2 can execute on behalf of a user (e.g., a user of user device 410), and can manage infrastructure of cloud computing environment 432, such as data management, synchronization, or long-duration data transfers.

Virtualized storage 434-3 includes one or more storage systems and/or one or more devices that use virtualization techniques within the storage systems or devices of computing resource 434. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 434-4 provides hardware virtualization techniques that allow multiple operating systems (e.g., "guest operating systems") to execute concurrently on a host computer, such as computing resource 434. Hypervisor 434-4 can present a virtual operating platform to the guest operating systems, and can manage the execution of the guest operating systems. Multiple instances of a variety of operating systems can share virtualized hardware resources.

Vehicle 440 includes a car, a truck, a motorcycle, a boat, a train, a plane, a drone, and/or the like. In some implementations, vehicle 440 include one or more devices capable of receiving a set of messages and/or instructions from collision detection platform 430. For example, vehicle 440 can include an on-board system that is capable of communicating with collision detection platform, that is capable of modifying operations of vehicle 440, and/or the like. In some implementations, vehicle 440 can be an autonomous vehicle. Alternatively, vehicle 440 can be a non-autonomous vehicle 440, in some implementations.

Camera 450 includes one or more devices capable of capturing video data, an image, and/or the like. For example, camera 450 can include a video camera, a still image camera, an infrared camera, and/or the like. In some implementations, camera 450 can capture video data of a roadway and can provide the video data to collision detection platform 430, as described elsewhere herein. In some implementations, camera 450 can process video data in a manner that is the same as or similar that described elsewhere herein, and can provide a result of processing the video data to collision detection platform 430, to server device 420 (e.g., at an edge of network 460) for further processing, for analysis, and/or the like, as described elsewhere herein.

Network 460 includes one or more wired and/or wireless networks. For example, network 460 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 4 are provided as one or more examples. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400.

Figure 5:
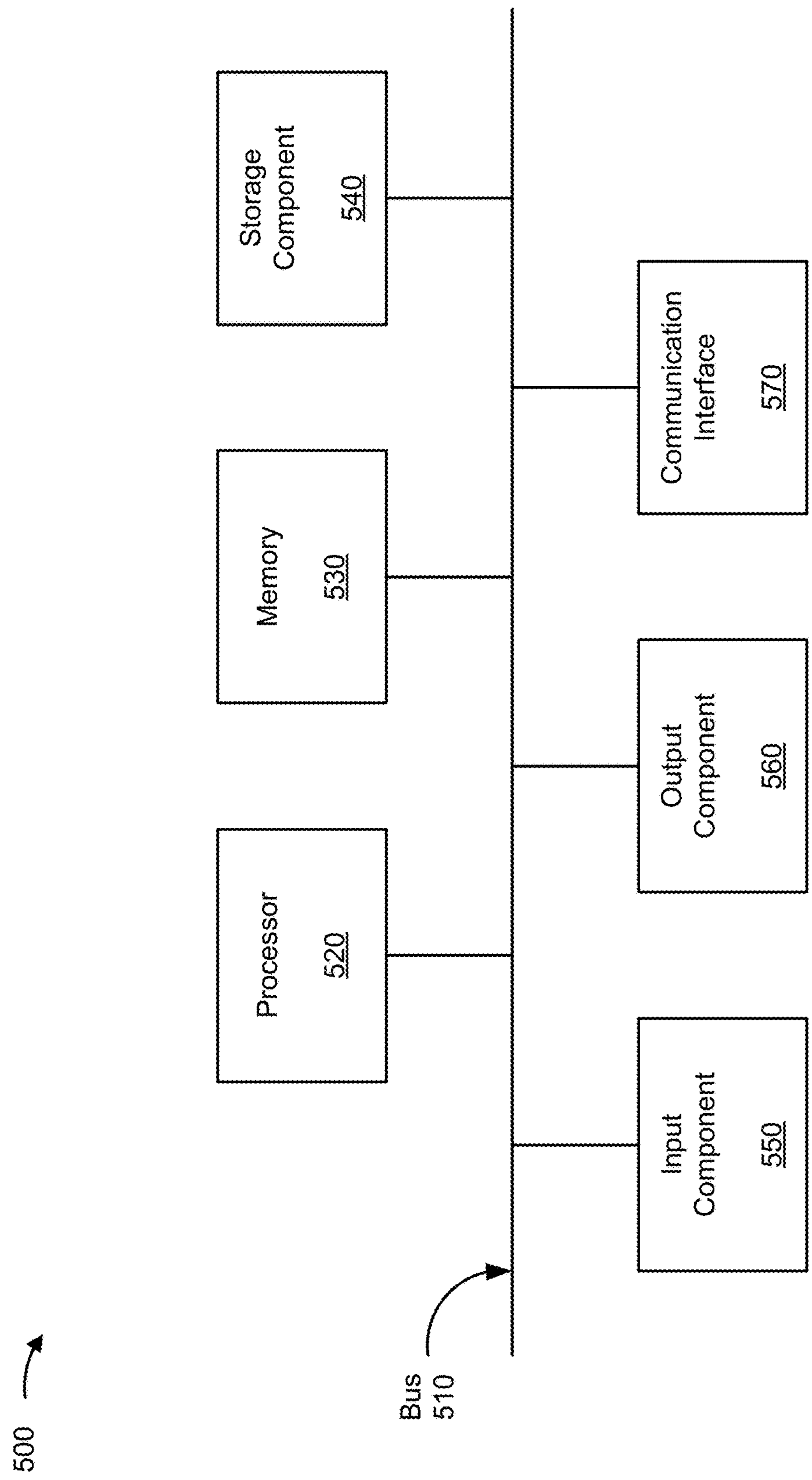
FIG. 5 is a diagram of example components of one or more devices of FIG. 2.

FIG. 5 is a diagram of example components of a device 500. Device 500 can correspond to user device 410, server device 420, collision detection platform 430, computing resource 434, vehicle 440, and/or camera 450. In some implementations, user device 410, server device 420, collision detection platform 430, computing resource 434, vehicle 440, and/or camera 450 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a Wi-Fi interface, a cellular network interface, and/or the like.

Device 500 can perform one or more processes described herein. Device 500 can perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
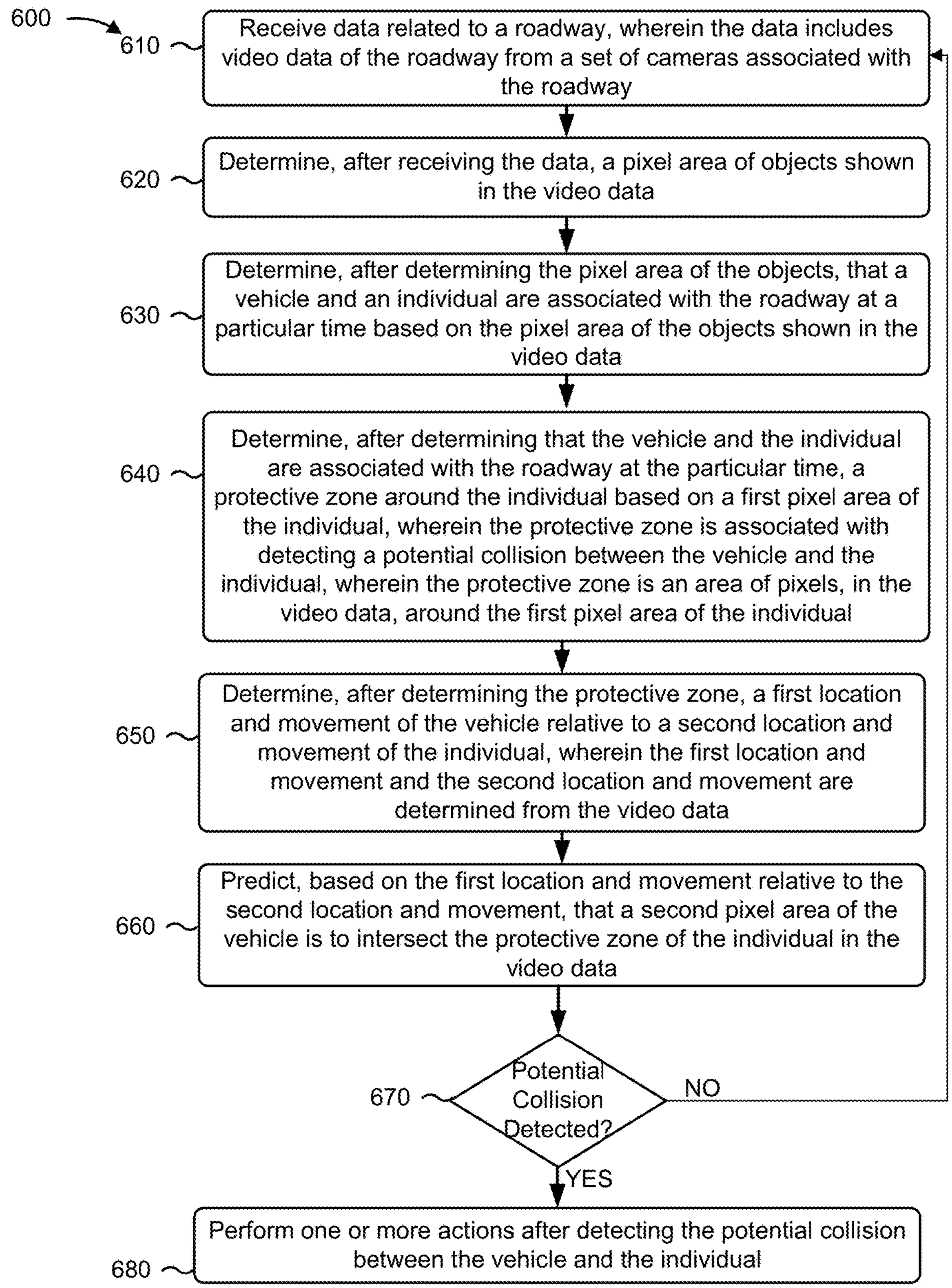
FIG. 6 is a flow chart of an example process for collision detection.

FIG. 6 is a flow chart of an example process 600 for collision detection. In some implementations, one or more process blocks of FIG. 6 can be performed by a collision detection platform (e.g., collision detection platform 430). In some implementations, one or more process blocks of FIG. 6 can be performed by another device or a group of devices separate from or including collision detection platform 430, such as a user device (e.g., user device 410), a server device (e.g., server device 420), a computing resource (e.g., computing resource 434), a vehicle (e.g., vehicle 440), and a camera (e.g., camera 450).

As shown in FIG. 6, process 600 can include receiving data related to a roadway, wherein the data includes video data of the roadway from a set of cameras associated with the roadway (block 610). For example, the collision detection platform (e.g., using computing resource 434, processor 520, input component 550, communication interface 570, and/or the like) can receive data related to a roadway, as described above. In some implementations, the data includes video data of the roadway from a set of cameras associated with the roadway.

As further shown in FIG. 6, process 600 can include determining, after receiving the data, a pixel area of objects shown in the video data (block 620). For example, the collision detection platform (e.g., using computing resource 434, processor 520, and/or the like) can determine, after receiving the data, a pixel area of objects shown in the video data, as described above.

As further shown in FIG. 6, process 600 can include determining, after determining the pixel area of the objects, that a vehicle and an individual are associated with the roadway at a particular time based on the pixel area of the objects shown in the video data (block 630). For example, the collision detection platform (e.g., using computing resource 434, processor 520, and/or the like) can determine, after determining the pixel area of the objects, that a vehicle and an individual are associated with the roadway at a particular time based on the pixel area of the objects shown in the video data, as described above.

As further shown in FIG. 6, process 600 can include determining, after determining that the vehicle and the individual are associated with the roadway at the particular time, a protective zone around the individual based on a first pixel area of the individual, wherein the protective zone is associated with detecting a potential collision between the vehicle and the individual, wherein the protective zone is an area of pixels, in the video data, around the first pixel area of the individual (block 640). For example, the collision detection platform (e.g., using computing resource 434, processor 520, and/or the like) can determine, after determining that the vehicle and the individual are associated with the roadway at the particular time, a protective zone around the individual based on a first pixel area of the individual, as described above. In some implementations, the protective zone is associated with detecting a potential collision between the vehicle and the individual. In some implementations, the protective zone is an area of pixels, in the video data, around the first pixel area of the individual.

As further shown in FIG. 6, process 600 can include determining, after determining the protective zone, a first location and movement of the vehicle relative to a second location and movement of the individual, wherein the first location and movement and the second location and movement are determined from the video data (block 650). For example, the collision detection platform (e.g., using computing resource 434, processor 520, and/or the like) can determine, after determining the protective zone, a first location and movement of the vehicle relative to a second location and movement of the individual, as described above. In some implementations, the first location and movement and the second location and movement are determined from the video data.

As further shown in FIG. 6, process 600 can include predicting, based on the first location and movement relative to the second location and movement, that a second pixel area of the vehicle is to intersect the protective zone of the individual in the video data (block 660). For example, the collision detection platform (e.g., using computing resource 434, processor 520, and/or the like) can predict, based on the first location and movement relative to the second location and movement, that a second pixel area of the vehicle is to intersect the protective zone of the individual in the video data, as described above.

As further shown in FIG. 6, process 600 can include determining whether the potential collision is detected (block 670). For example, the collision detection platform (e.g., using computing resource 434, processor 520, and/or the like) can determine whether the potential collision is detected, as described above.

As further shown in FIG. 6, if the collision detection platform determines that the potential collision is not detected (block 670—NO), then process 600 can include returning to block 610. For example, if the collision detection platform determines that the potential collision is not detected, then process 600 can include receiving data related to a roadway, as described above.

As further shown in FIG. 6, if the collision detection platform determines that the potential collision is detected (block 670—YES), then process 600 can include performing one or more actions after detecting the potential collision between the vehicle and the individual (block 680). For example, if the collision detection platform detects, based on predicting that the second pixel area of the vehicle is to intersect the protective zone, the potential collision between the vehicle and the individual, then the collision detection platform (e.g., using computing resource 434, processor 520, memory 530, storage component 540, output component 560, communication interface 570, and/or the like) can perform one or more actions after detecting the potential collision between the vehicle and the individual, as described above.

Process 600 can include additional implementations, such as any single implementation or any combination of implementations described below and/or in connection with one or more other processes described elsewhere herein.

In some implementations, the collision detection platform can receive, from a traffic controller device, phase data that indicates a phase of a traffic light or a crossing light associated with the roadway, and can determine, from the phase data, a cause of the potential collision between the vehicle and the individual. In some implementations, the collision detection platform can determine the first pixel area of a first object shown in the video data at a first time and the second pixel area of a second object shown in the video data at the first time, can determine, after determining the first pixel area and the second pixel area, that the first pixel area of the first object matches a predicted pixel area for a single individual and that the second pixel area matches a predicted pixel area for a single vehicle, and can determine that the vehicle and the individual are associated with the roadway at the particular time based on: the first pixel area matching the predicted pixel area for the single individual at the first time, and the second pixel area matching the predicted pixel area for the single vehicle at the first time.

In some implementations, the collision detection platform can identify the vehicle and the individual in a first frame of the video data, can track the vehicle and the individual from the first frame across one or more other frames, subsequent to the first frame, of the video data, and can determine the first location and movement and the second location and movement based on tracking the vehicle and the individual from the first frame across the one or more other frames of the video data. In some implementations, the collision detection platform can determine that a quantity of pixels between the first pixel area associated with the individual and the second pixel area associated with the vehicle satisfies a threshold, and can detect the potential collision based on the quantity of pixels satisfying the threshold.

In some implementations, the collision detection platform can perform, after detecting the potential collision, an analysis of the potential collision and one or more other collisions associated with the roadway. In some implementations, the collision detection platform can determine that the roadway is associated with a threshold quantity of potential collisions based on a result of performing the analysis of the potential collision and the one or more other collisions, and can send a message to another vehicle or to a user device associated with another individual, wherein the message is associated with at least one of: notifying the other individual that the roadway is associated with the threshold quantity of potential collisions, providing directions for display that include information related to avoiding the roadway, or causing the other vehicle to perform an action when approaching a particular location on the roadway.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:

receiving, by a device, data related to a roadway,
 wherein the data includes video data of the roadway from a set of cameras associated with the roadway;

determining, by the device and after receiving the data, a first pixel area associated with objects shown in the video data;

determining, by the device and after determining the first pixel area associated with the objects, that a vehicle and an individual are associated with the roadway at a same time based on the first pixel area associated with the objects shown in the video data;

identifying, by the device, the vehicle and the individual in a first frame of the video data;

tracking, by the device, the vehicle and the individual from the first frame across one or more other frames, subsequent to the first frame, of the video data;

determining, by the device and based on tracking the individual from the first frame across the one or more other frames, at least one of a speed of travel of the individual or a direction of travel of the individual;

determining, by the device and based on at least one of the speed of travel of the individual or the direction of travel of the individual, a protective zone around the individual,
 wherein the protective zone is associated with detecting a potential collision between the vehicle and the individual, and
 wherein the protective zone is an area of pixels, in the video data, around a second pixel area associated with the individual;

determining, by the device and based on tracking the vehicle and the individual from the first frame across the one or more other frames, that a quantity of pixels between a third pixel area associated with the vehicle and the protective zone of the individual in the video data satisfies a threshold quantity of pixels;

detecting, by the device and based on determining that the quantity of pixels between the third pixel area associated with the vehicle and the protective zone of the individual satisfies the threshold quantity of pixels, the potential collision between the vehicle and the individual; and performing, by the device, one or more actions after detecting the potential collision between the vehicle and the individual.

2. The method of claim 1, wherein receiving the data comprises:

receiving, from a traffic controller device, phase data that indicates a phase of a traffic light or a crossing light associated with the roadway; and wherein the method further comprises:

determining, from the phase data, a cause of the potential collision between the vehicle and the individual.

3. The method of claim 1, further comprising:

determining a fourth pixel area associated with a first object shown in the video data at a first time and a fifth pixel area associated with a second object shown in the video data at the first time;

determining, after determining the fourth pixel area and the fifth pixel area, that the fourth pixel area matches a first predicted pixel area for the individual at the first time and that the fifth pixel area matches a second predicted pixel area for the vehicle at the first time; and wherein determining that the vehicle and the individual are associated with the roadway at the same time comprises:

determining that the vehicle and the individual are associated with the roadway at the same time based on:

the fourth pixel area matching the first predicted pixel area for the individual at the first time, and the fifth pixel area matching the second predicted pixel area for the vehicle at the first time.

4. The method of claim 1, wherein performing the one or more actions comprises:

performing, after detecting the potential collision, an analysis of the potential collision and one or more other collisions associated with the roadway.

5. The method of claim 4, wherein performing the one or more actions comprises:

determining that the roadway is associated with a threshold quantity of potential collisions based on a result of performing the analysis of the potential collision and the one or more other collisions; and sending a message to another vehicle or to a user device associated with another individual, wherein the message is associated with at least one of:

notifying the other individual that the roadway is associated with the threshold quantity of potential collisions, providing directions for display that include information related to avoiding the roadway, or causing the other vehicle to perform an action when approaching a particular location on the roadway.

6. The method of claim 1, wherein performing the one or more actions comprises:

determining a cause of the potential collision; and issuing a ticket to the vehicle, an owner of the vehicle, and/or the individual based on determining a cause of the potential collision.

7. The method of claim 1, wherein performing the one or more actions comprises:

receiving traffic rule data that identifies a set of traffic rules; and determining whether the vehicle or the individual is a cause of the potential collision based on the set of traffic rules and the video data.

8. A device, comprising:

one or more memories; and one or more processors communicatively coupled to the one or more memories, to:

receive data related to a roadway, wherein the data includes video data of the roadway from a set of cameras associated with the roadway;

determine, after receiving the data, a first pixel area associated with objects shown in the video data;

determine, after determining the first pixel area associated with the objects, that a vehicle and an individual are associated with the roadway at a same time based on the first pixel area associated with the objects shown in the video data;

identify the vehicle and the individual in a first frame of the video data;

track the vehicle and the individual from the first frame across one or more other frames, subsequent to the first frame, of the video data;

determine, based on tracking the individual from the first frame across the one or more other frames, at least one of a speed of travel of the individual or a direction of travel of the individual;

determine, based on at least one of the speed of travel of the individual or the direction of travel of the individual, a protective zone around the individual, wherein the protective zone is associated with detecting a potential collision between the vehicle and the individual, and wherein the protective zone is an area of pixels, in the video data, around a second pixel area associated with the individual;

determine, based on tracking the vehicle and the individual from the first frame across the one or more other frames, that a quantity of pixels between a third pixel area associated with the vehicle and the protective zone of the individual in the video data satisfies a threshold quantity of pixels;

detect, by the device and based on determining that the quantity of pixels between the third pixel area associated with the vehicle and the protective zone of the individual satisfies the threshold quantity of pixels, the potential collision between the vehicle and the individual; and perform, by the device, one or more actions after detecting the potential collision between the vehicle and the individual.

9. The device of claim 8, wherein the one or more processors, when receiving the data, are to:

receive, from a traffic controller device, phase data that indicates a phase of a traffic light or a crossing light associated with the roadway; and wherein the one or more processors are further to:

determine, from the phase data, a cause of the potential collision between the vehicle and the individual.

10. The device of claim 8, wherein the one or more processors are further to:

determine a fourth pixel area associated with a first object shown in the video data at a first time and a fifth pixel area associated with a second object shown in the video data at the first time;

determine, after determining the fourth pixel area and the fifth pixel area, that the fourth pixel area matches a first predicted pixel area for the individual at the first time and that the fifth pixel area matches a second predicted pixel area for the vehicle at the first time; and wherein the one or more processors, when determining that the vehicle and the individual are associated with the roadway at the same time, are to:

determine that the vehicle and the individual are associated with the roadway at the same time based on:

the fourth pixel area matching the first predicted pixel area for the individual at the first time, and the fifth pixel area matching the second predicted pixel area for the vehicle at the first time.

11. The device of claim 8, wherein the one or more processors, when performing the one or more actions are to:

perform, after detecting the potential collision, an analysis of the potential collision and one or more other collisions associated with the roadway.

12. The device of claim 11, wherein the one or more processors, when performing the one or more actions, are to:

determine that the roadway is associated with a threshold quantity of potential collisions based on a result of performing the analysis of the potential collision and the one or more other collisions; and send a message to another vehicle or to a user device associated with another individual, wherein the message is associated with at least one of:

notifying the other individual that the roadway is associated with the threshold quantity of potential collisions, providing directions for display that include information related to avoiding the roadway, or causing the other vehicle to perform an action when approaching a particular location on the roadway.

13. The device of claim 8, wherein the one or more processors, when performing the one or more actions, are to:

determine a cause of the potential collision; and issue a ticket to the vehicle, an owner of the vehicle, and/or the individual based on determining a cause of the potential collision.

14. The device of claim 8, wherein the one or more processors, when performing the one or more actions, are to:

receive traffic rule data that identifies a set of traffic rules; and determine whether the vehicle or the individual is a cause of the potential collision based on the set of traffic rules and the video data.

15. A non-transitory computer-readable medium storing one or more instructions, the one or more instructions comprising:

one or more instructions that, when executed by one or more processors of a device, cause the one or more processors to:

receive data related to a roadway, wherein the data includes video data of the roadway from a set of cameras associated with the roadway;

determine, after receiving the data, a first pixel area associated with objects shown in the video data;

determine, after determining the first pixel area associated with the objects, that a vehicle and an individual are associated with the roadway at a same time based on the first pixel area associated with the objects shown in the video data;

identify the vehicle and the individual in a first frame of the video data;

track the vehicle and the individual from the first frame across one or more other frames, subsequent to the first frame, of the video data;

determine, based on tracking the individual from the first frame across the one or more other frames, at least one of a speed of travel of the individual or a direction of travel of the individual;

determine, based on at least one of the speed of travel of the individual or the direction of travel of the individual, a protective zone around the individual, wherein the protective zone is associated with detecting a potential collision between the vehicle and the individual, and wherein the protective zone is an area of pixels, in the video data, around a second pixel area associated with the individual;

determine, based on tracking the vehicle and the individual from the first frame across the one or more other frames, that a quantity of pixels between a third pixel area associated with the vehicle and the protective zone of the individual in the video data satisfies a threshold quantity of pixels;

detect, based on determining that the quantity of pixels between the third pixel area associated with the vehicle and the protective zone of the individual satisfies the threshold quantity of pixels, the potential collision between the vehicle and the individual; and perform one or more actions after detecting the potential collision between the vehicle and the individual.

16. The non-transitory computer-readable medium of claim 15, wherein the one or more instructions, that cause the one or more processors to receive the data, cause the one or more processors to:

receive, from a traffic controller device, phase data that indicates a phase of a traffic light or a crossing light associated with the roadway; and wherein the one or more instructions, when executed by the one or more processors, further cause the one or more processors to:

determine, from the phase data, a cause of the potential collision between the vehicle and the individual.

17. The non-transitory computer-readable medium of claim 15, wherein the one or more instructions, when executed by the one or more processors, further cause the one or more processors to:

determine a fourth pixel area associated with a first object shown in the video data at a first time and a fifth pixel area associated with a second object shown in the video data at the first time;

determine, after determining the fourth pixel area and the fifth pixel area, that the fourth pixel area matches a first predicted pixel area for the individual at the first time and that the fifth pixel area matches a second predicted pixel area for the vehicle at the first time; and wherein the one or more instructions, that cause the one or more processors to determine that the vehicle and the individual are associated with the roadway at the same time, cause the one or more processors to:

determine that the vehicle and the individual are associated with the roadway at the same time based on:

the fourth pixel area matching the first predicted pixel area for the individual at the first time, and the fifth pixel area matching the second predicted pixel area for the vehicle at the first time.

18. The non-transitory computer-readable medium of claim 15, wherein the one or more instructions, that cause the one or more processors to perform the one or more actions, cause the one or more processors to:

determine that the roadway is associated with a threshold quantity of potential collisions based on a result of performing an analysis of the potential collision and one or more other collisions; and send a message to another vehicle or to a user device associated with another individual, wherein the message is associated with at least one of:

notifying the other individual that the roadway is associated with the threshold quantity of potential collisions, providing directions for display that include information related to avoiding the roadway, or causing the other vehicle to perform an action when approaching a particular location on the roadway.

19. The non-transitory computer-readable medium of claim 15, wherein the one or more instructions, that cause the one or more processors to perform the one or more actions, cause the one or more processors to:

determine a cause of the potential collision; and issue a ticket to the vehicle, an owner of the vehicle, and/or the individual based on determining a cause of the potential collision.

20. The non-transitory computer-readable medium of claim 15, wherein the one or more instructions, that cause the one or more processors to perform the one or more actions, cause the one or more processors to:

receive traffic rule data that identifies a set of traffic rules; and determine whether the vehicle or the individual is a cause of the potential collision based on the set of traffic rules and the video data.

* * * * *